United States Patent

Hofmann et al.

[11] Patent Number: 6,070,707
[45] Date of Patent: Jun. 6, 2000

[54] FRICTION CLUTCH

[75] Inventors: Klaus Hofmann, Leutershausen; Thomas Rudolf, Dettelbach; Horst Friedrich, Aidhausen/Happerthausen; Claus Orth, Mönchstockheim; Werner Selzam, Wipfeld, all of Germany

[73] Assignee: Sachs Race Engineering GmbH, Schweinfurt, Germany

[21] Appl. No.: 09/267,256

[22] Filed: Mar. 12, 1999

[30] Foreign Application Priority Data

Mar. 13, 1998 [DE] Germany ............... 198 10 918

[51] Int. Cl.[7] ............................................... F16D 13/68
[52] U.S. Cl. .................................. 192/70.2; 192/109 R
[58] Field of Search ............... 192/70.19, 70.2, 192/109 R

[56] References Cited

U.S. PATENT DOCUMENTS

| | | | |
|---|---|---|---|
| Re. 19,876 | 3/1936 | Criley | 192/70.2 X |
| 2,016,305 | 10/1935 | Wales | 192/70.19 X |
| 2,441,140 | 5/1948 | Fishburn | 192/70.19 |
| 5,301,779 | 4/1994 | Nash | 192/70.2 |
| 5,355,984 | 10/1994 | Grabis | 192/70.19 X |
| 5,638,932 | 6/1997 | Mizukami | 192/109 R X |
| 5,743,367 | 4/1998 | Hofmann et al. | 192/109 R X |
| 5,857,546 | 1/1999 | Hofmann et al. | 192/109 R X |

FOREIGN PATENT DOCUMENTS

| | | | |
|---|---|---|---|
| 0 764 793 | 3/1997 | European Pat. Off. | F16D 13/64 |
| 43 24 203 | 1/1995 | Germany | F16D 13/71 |
| 2 301 156 | 11/1996 | United Kingdom | F16D 13/52 |
| 91/14878 | 10/1991 | WIPO | F16D 13/68 |

Primary Examiner—Richard M. Lorence
Attorney, Agent, or Firm—Cohen, Pontani, Lieberman & Pavane

[57] ABSTRACT

The invention relates to a friction clutch in which an axial play is provided between an inner disk and a hub of a clutch disk. The axial play can be influenced by a device during assembly of the friction clutch in an engine and transmission of a motor vehicle drivetrain such that the hub is displaced, within the axial play, into the position in the axial play which lies closest to a flywheel of the friction clutch.

6 Claims, 4 Drawing Sheets

FRICTION CLUTCH

BACKGROUND OF THE INVENTION

1. Field of the Invention

The invention relates to a friction clutch in accordance with the preamble of the main claim.

2. Description of the Related Art

A prior art clutch disk is disclosed by German Laid-Open Specification 43 24 203 that has a friction clutch with an inner disk. The inner disk is connected to the hub in a rotationally fixed manner by a toothing and both components are fixed in the axial direction with respect to one another, with an axial play which results from production tolerances being provided between the two parts.

U.S. Pat. No. 5,301,779 discloses a prior art device for guiding a plurality of inner disks of a multidisk clutch in a rotationally fixed manner on the hub with securing means which extend in the axial direction between two adjacent inner disks. The securing means are provided in the hub to axially secure the latter in the axial direction. In this case too, an axial play is provided between the securing means and the disks. This play is also required, for example, in view of the wear to the individual disks.

It has now been found, particularly in the case of vehicles which are used in motor sports events, that uneven force transmission may arise during the start-up operation, which stems from the fact that at the beginning of torque transmission, i.e. during the clutch engaging operation, the hub may adopt a different axial position, specifically to the extent of the play between the securing means and the corresponding stops. If the hub adopts a position which is remote from the flywheel during the start-up operation, during the engagement operation the hub has to be displaced axially from the transmission shaft, specifically toward the flywheel. As the torque transmission increases, this axial displacement requires an increasingly high force and, under certain circumstances may be carried out jerkily. The force required to move the hub toward the flywheel has an adverse effect on the torque transmission from the engine to the transmission during the start-up operation.

SUMMARY OF THE INVENTION

The object of the present invention is to improve the start-up operation by influencing the axial position of the hub within the construction-related axial play.

According to the invention, this object is achieved by a friction clutch for use in a drive train of a motor vehicle, comprising, a flywheel rotatable about an axis of rotation and connectable to a crank shaft of the motor vehicle, a clutch housing fixedly connected to said flywheel, a pressure plate arranged in said clutch housing such that said pressure plate is rotatably fixed and axially movable with respect to said clutch housing, a disk having an internal toothing and arranged between said pressure plate and said flywheel such that said disk is clampable between said pressure plate and said flywheel when said pressure plate is urged toward said flywheel, a hub having an external toothing and rotatable about said axis of rotation, said internal toothing of said disk and said external toothing of said hub creating a rotatably fixed and axially movable connection between said hub and said disk such that disk is axially movable with respect to said hub within an amount of axial play and a device operatively arranged for axially displacing said hub within said amount of axial play to a position within said amount of axial play that is closest to said flywheel during assembly of said friction clutch into the drive train of the motor vehicle.

The present invention provides a device which displaces the hub, within the axial play, into the position which lies closest to the flywheel when the engine, friction clutch and transmission are being assembled. This ensures that there is no need for any further displacement of the hub toward the flywheel during the clutch engagement operation—even if wear to the disk or disks may occur as early as in this situation. Since the hub does not have to be moved to engage the clutch, there is no expectation of any resistance from axial movement of the hub which could have an adverse effect on the clutch engagement operation.

In one embodiment of the present invention, an internal toothing of the hub is fitted onto external toothing of the transmission input shaft and the device comprises a plastic material element arranged between the internal toothing of the hub and the external toothing of the transmission shaft. During assembly of the engine, friction clutch and transmission, this plastic material inside the toothing ensures that a high pushing force is required to introduce the transmission shaft into the internal toothing of the hub. As a result, the hub is displaced toward the flywheel as far as its axial mobility allows. A precondition for this is that the friction clutch is in the closed state at least during the final part of this axial displacement during assembly.

Furthermore, it is proposed that the plastic material is designed such that its melting point is reached or exceeded at the operating temperatures of the hub and/or transmission input shaft. Selecting the plastic material in this way allows the resistance of the plastic material to axial displacement to be influenced during operation of the friction clutch such that the axial mobility is fully restored during operation of the friction clutch. This ensures that during subsequent gear change operations both the engagement operation and the release operation are performed without hindrance. Preferably, the material is designed in such a way that the plastic material is made to flow even by the temperature produced in the area of the toothing after a start-up operation carried out under racing conditions.

In another embodiment the plastic material is applied to the internal toothing of the hub and/or the external toothing of the transmission input shaft. In this case, it is entirely sufficient to apply the plastic material to one of the two components (hub or transmission input shaft).

The plastic material may advantageously be applied to the appropriate component by injection molding. However, it is also conceivable, by way of example, for the transmission shaft to be provided with an appropriate coating by being immersed in plastic material.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
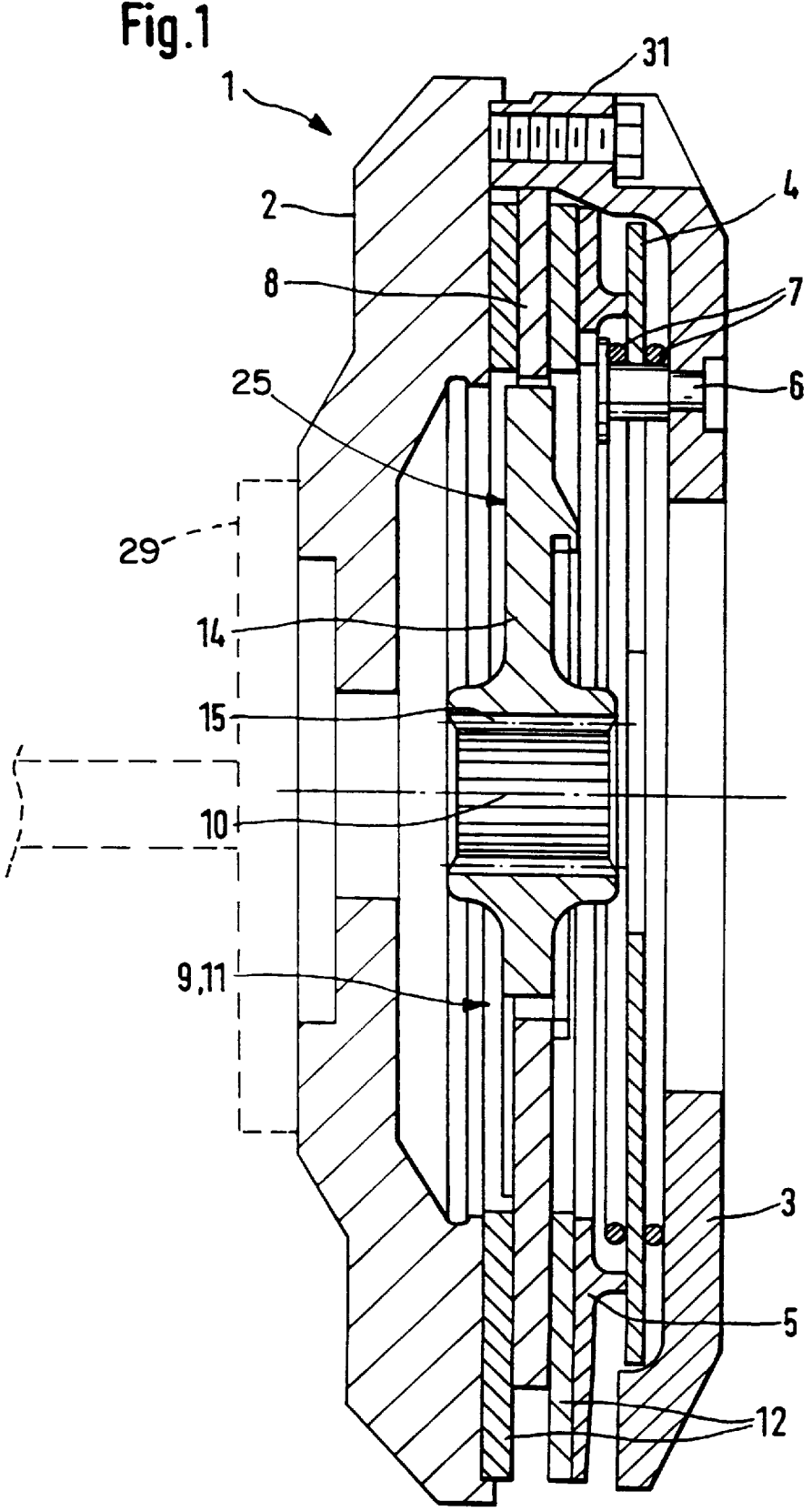
FIG. 1 is a longitudinal sectional view of a friction clutch with an inner disk according to an embodiment of the present invention.

Referring to FIG. 1, a friction clutch 1 according to an embodiment of the present invention includes a flywheel 2 arrangable on a crankshaft 29 of an internal combustion engine (not shown). A clutch housing 3 is fixedly connected on the flywheel 2 via fastening devices such, for example, as threaded bolts 31. A pressure plate 5 is mounted within the clutch housing 3 such that it is rotationally fixed and axially displaceable with respect to the clutch housing 3. The guidance of the pressure plate 5 may, for example, be effected by tangential leaf springs or axially running bearing edges between the pressure plate 5 and the clutch housing 3. A diaphragm spring 4 is arranged axially between the pressure plate 5 and the clutch housing 3 and is supported on the clutch housing 3 via wire rings 7 and a plurality of spacer bolts 6 which are circumferentially distributed. An area of the diaphragm spring 4 arranged radially outside the spacer bolts 6 exerts an axial force on the pressure plate 5 to press the friction disk of a clutch disk 25 against the flywheel 2 to transmit torque. Radially inside the spacer bolts 6, the diaphragm spring 4 is provided with spring tongues which interact with a release system (not shown). In the present case, the clutch disk 25 comprises a hub 14 connected in a rotationally fixed manner to an inner disk 8. The connection is via toothings 9, 11 and is designed in essentially a play-free rotationally fixed connection with a predetermined amount of axial play. An internal toothing 15 of the hub 14 is attached in a rotationally fixed manner to a transmission shaft 17 (see FIG. 3). All the components of the friction clutch 1 are arranged concentrically with respect to an axis of rotation 10 and are rotatable about this axis together with the crankshaft of the internal combustion engine. In the present case, the friction clutch 1 also includes two outer disks 12 connected to the clutch housing 3 in a rotationally fixed and axially displaceable manner.

Figure 2:
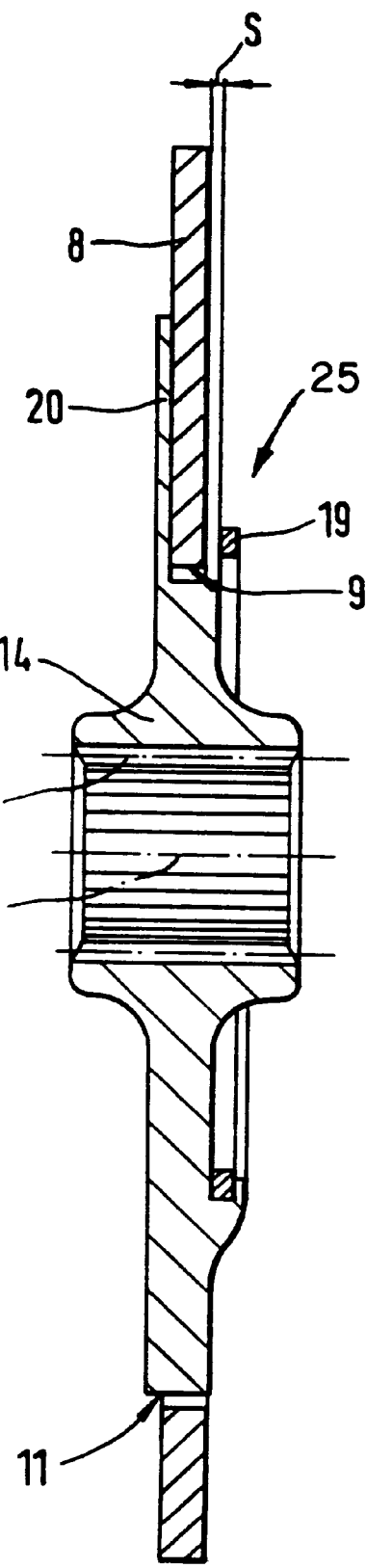
FIG. 2 is a longitudinal sectional view of the clutch disk of the friction clutch in accordance with FIG. 1.

FIG. 2 shows the clutch disk 25 of the friction clutch in FIG. 1. This clutch disk 25 comprises the hub 14 with the internal toothing 15 for a rotatably fixed engagement with the transmission input shaft 17 (see FIG. 3) and the external toothing 11 for rotatably fixed engagement with the internal toothing 9 of the inner disk 8. The hub 14 further includes a circumferential web which forms a first axial stop 20 for the inner disk 8 in the direction of the flywheel 2. A second axial stop 19 is arranged on the opposing side of the inner disk 8 such that an axial play S is formed between the inner disk 8 and the hub 14. The first and second axial stops 20 and 19 are required to prevent the hub 14 from axially migrating outside of an axial region having an axial play S during operation of the friction clutch. A connection between inner disk 8 and hub 14 without axial play is theoretically possible, but is not to be recommended for various reasons. Firstly, the accuracy required for the production process is inhibiting, and secondly the play has a beneficial effect on the ventilation of the clutch.

It has been found that under certain operating conditions, the clutch with a clutch disk having axial play exhibits uneven torque transmission during the start-up operation of the vehicle. This is undesirable in any start-up operations and is especially so in start-up operation for racing sports cars. The reason for these uneven torque transmissions is that before the start-up operation, while the first gear is engaged and the clutch is being ventilated via the operating system, the axial position of the hub 14 on the transmission input shaft 17 is not defined due to the axial play S of the position of the hub 14. The engine vibrations may cause the hub 14 to move with respect to the inner disk 8, within the range of an axial play S, toward or away from the flywheel 2 (see FIG. 1). If the position of the hub 14 at the initiation of a start-up operation is such that the axial play S is situated between the inner disk 8 and the right-hand axial stop 19, as shown in FIG. 2, even a slight movement of the inner disk 8 toward the flywheel 2 during the clutch engagement operation inevitably leads to the hub 14 also being forced toward the flywheel 2. The movement of the hub 14 is made more difficult by the fact that torque is already being transmitted via the toothing 15. Accordingly, the hub 14 is movable toward the flywheel 2 in an appropriate manner only with the aid of relatively great engagement forces, (i.e., the clutch engagement operation) when the axial play S is on the flywheel side between the first axial stop 20 and the inner disk 8 at the initiation of a start-up operation, the start-up operation occurs without uneven torque transmission because the engagement movement of the pressure plate 5 and the inner disk 8 toward the flywheel is performed without requiring axial displacement of the hub 14. In this connection, it should be noted that the axial displacement between the inner disk 8 with its internal toothing 9 on the external toothing 11 of the hub 14 is subject to lower circumferential forces because the location of the toothings 9, 11 is a greater radial distance from the axis of rotation 10 than the toothing 15.

Figure 3:
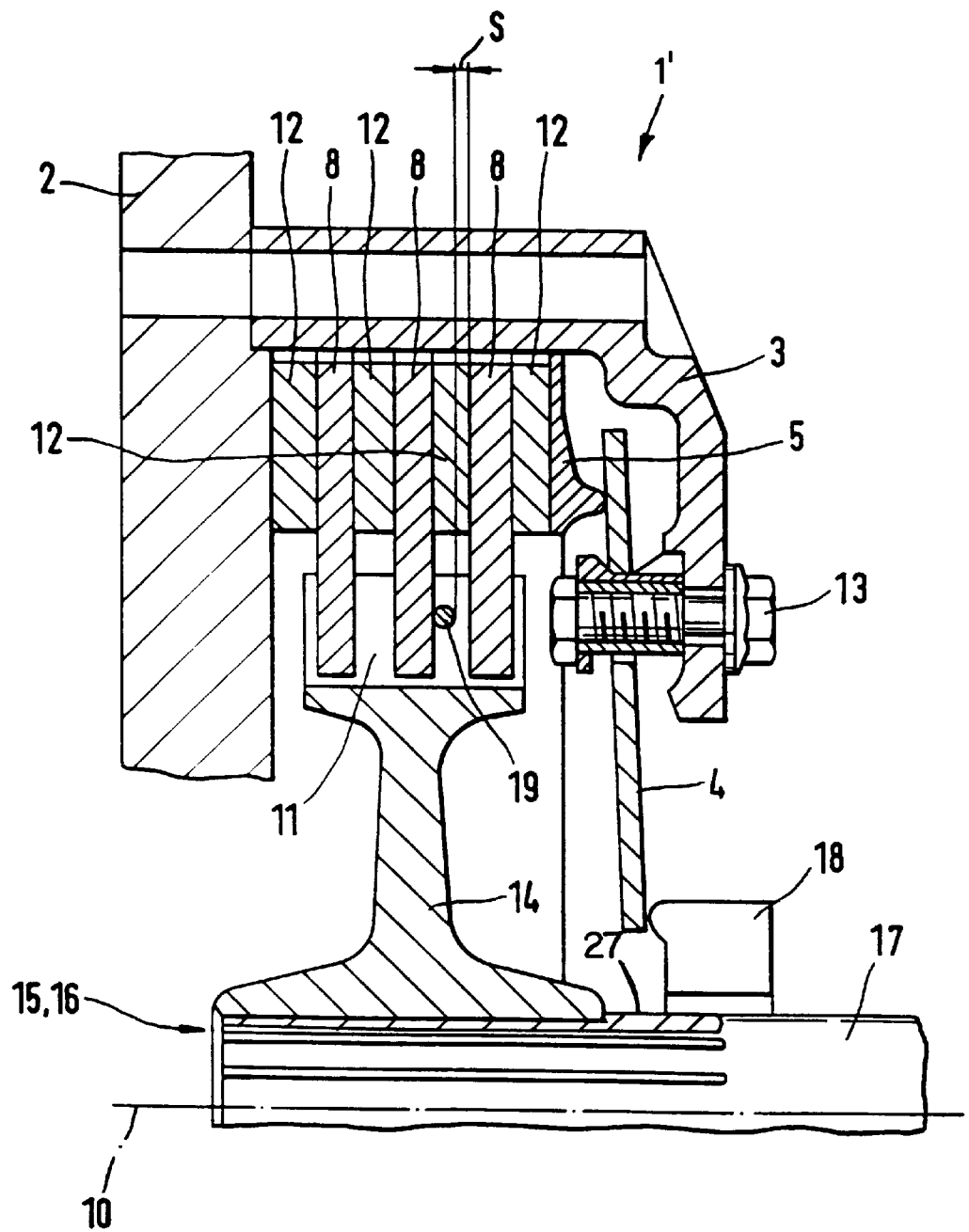
FIG. 3 is a longitudinal sectional view of the top half of a multidisk clutch according to an embodiment of the present invention.

FIG. 3 shows a longitudinal section through the top half of a multidisk clutch 1' which includes a plurality of outer disks 12 and a plurality of inner disks 8. In operational terms, the customary structure of the multidisk clutch 1' is identical to the friction clutch 1 shown in FIG. 1. The inner disks 8 and the outer disks 12 of such multidisk clutches typically comprise carbon material when these clutches are designed for use in motor sports. The clutch 1' has a flywheel 2 to which the clutch housing 3 is attached, via fastening device such as the threaded bolts 31 shown in FIG. 1.

In the FIG. 3 embodiment, the diaphragm spring 4 is supported on the clutch housing 3 via a plurality of threaded bolts 13 which are circumferentially distributed. In the engaged state of the clutch 1', the prestressing force of the diaphragm spring 4 acts on the disks 8, 12 via the pressure plate 5 and presses these disks 8, 12 together toward the flywheel 2. The inner disks 8 are connected to the hub 14 in a rotationally fixed connection but are axially displaceable relative to the hub in that they have internal toothing which engages in corresponding external toothing 11 on the hub 14. The internal toothing 15 of the hub 14 is fitted onto an external toothing 16 of a transmission input shaft 17. A clutch operator 18 is diagramatically shown which acts on the radially inward facing tongues of the diaphragm spring 4. In the present embodiment, an axial stop 19' is arranged between the first and second inner disks 8 with respect to the diaphragm spring 4. The axial stop 19' is provided to axially secure the hub 14 with respect to the inner disks 8. In this case, a precondition for a successful start-up operation is that the axial play S is arranged between the axial stop 19' and the first inner disk 8 with respect to the diaphragm spring 4. The clutch 1' is ventilated by actuation of the clutch operator 18 in that the radially inner area of the diaphragm spring 4 is moved toward the flywheel 2. The actuation of the clutch operator results in a lifting of the radially outer area of the diaphragm spring 4 off of the pressure plate 5 such that all the disks 8, 12 can be ventilated. If a clutch engagement operation is now initiated and the hub 14 is held in the position shown in FIG. 3, a perfect start-up operation is attainable because the engagement movement of the disks 8, 12 toward the flywheel 2 is not inhibited by a need to displace the hub 14 in the axial direction during the engagement operation. As mentioned above, the displacement in the toothing 11 with respect to the toothing 9 of the inner disk 8 is easier to execute because the location of the toothings 9, 11 is at a considerably greater radial distance from the axis of rotation 10.

The present invention therefore consists of a plastic element 27 introduced between the toothing 16 of the transmission input shaft 17 and the internal toothing 15 of the hub 14. The plastic element 27, during assembly of engine, clutch and transmission, ensures that the first time the clutch is brought into service thereafter, the hub 14 is held in its position closest to the flywheel 2. When the transmission shaft 17 is introduced into the internal toothing 15 of the hub 14, the plastic 27 exerts an appropriate axial force on the hub 14 such that during the first actuation or actuations of the friction clutch, the hub 14 is held in this position close to the flywheel 2. By selecting a material for the plastic element 27 such that the plastic becomes flowable at the operating temperature in the region of the hub 14 or of the transmission input shaft 17, the flowability of this material of the plastic 27 may be utilized to reduce the axial force between the transmission input shaft 17 and the hub 14, at the earliest after the first clutch engagement operation performed under racing conditions. The clutch 1 and/or 1' is then operable normally during subsequent gear change operations. The demands placed on the clutch engagement operation following a gear change operation are considerably lower than the demands placed on the first racing start.

Figure 3A:
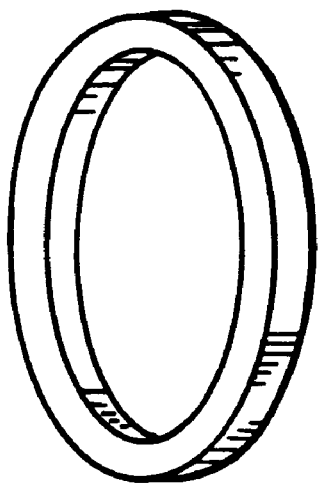
FIGS. 3A and 3B show different embodiments of a plastic element used in the clutches of FIGS. 1–3.
Figure 3B:
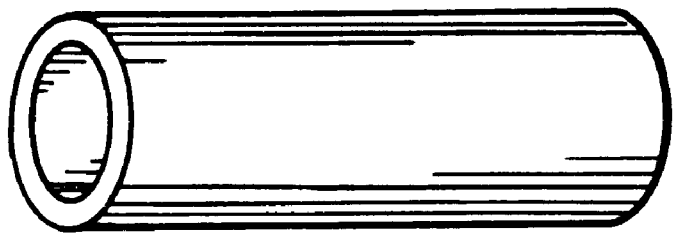

The plastic element 27 may comprise an axially extending strip as shown in FIG. 3. Alternatively the plastic element 27 may comprise a continuous annular piece 27a as shown in FIG. 3A of any cross-sectional shape or a cylindrical piece 27b as shown in FIG. 3B. In any embodiment, the plastic element 27, 27a, or 27b is arranged between the toothing 16 of the transmission input shaft 17 and the internal toothing 15 of the hub 14 for holding the hub 14 in its position closest to the flywheel 2.

The invention is not limited by the embodiments described above which are presented as examples only but can be modified in various ways within the scope of protection defined by the appended patent claims.

What is claimed is:

1. A friction clutch for use in a drive train of a motor vehicle, comprising:
    a flywheel rotatable about an axis of rotation and connectable to a crank shaft of the motor vehicle;
    a clutch housing fixedly connected to said flywheel;
    a pressure plate arranged in said clutch housing such that said pressure plate is rotatably fixed and axially movable with respect to said clutch housing;
    a disk having an internal toothing and arranged between said pressure plate and said flywheel such that said disk is clampable between said pressure plate and said flywheel when said pressure plate is urged toward said flywheel;
    a hub having an external toothing and rotatable about said axis of rotation, said internal toothing of said disk and said external toothing of said hub creating a rotatably fixed and axially movable connection between said hub and said disk such that disk is axially movable relative to said hub within an amount of axial play; and
    a device operatively arranged for axially displacing said hub to a position within said amount of axial play that is closest to said flywheel during assembly of said friction clutch into the drive train of the motor vehicle and holding said hub in said position until at least a first operation of said clutch in the motor vehicle, said device further operatively arranged for restoring axial mobility of said hub within said amount of play after said at least said first operation of said clutch in the motor vehicle.

2. The friction clutch of claim 1, wherein said hub comprises an internal toothing engagable with an external toothing of a transmission input shaft of the motor vehicle; and
    wherein said device comprises a plastic material element arrangable between said internal toothing of said hub and the external toothing of the transmission input shaft.

3. The friction clutch of claim 2, wherein said plastic material element comprises a melting point that is reached or exceeded at the operating temperature in an area proximate said hub during said at least said first operation of said clutch in said motor vehicle for restoring axial mobility of said hub within said amount of play.

4. The friction clutch of claim 2, wherein said plastic material element is one of applied to said internal toothing of said hub and applicable to the external toothing of the transmission input shaft.

5. The friction clutch of claim 4, wherein said plastic material element is applied to said internal toothing of said hub via injection molding.

6. The friction clutch of claim 4, wherein said plastic material element is applicable to the external toothing of the transmission input shaft via injection molding.

* * * * *